Figure 1:
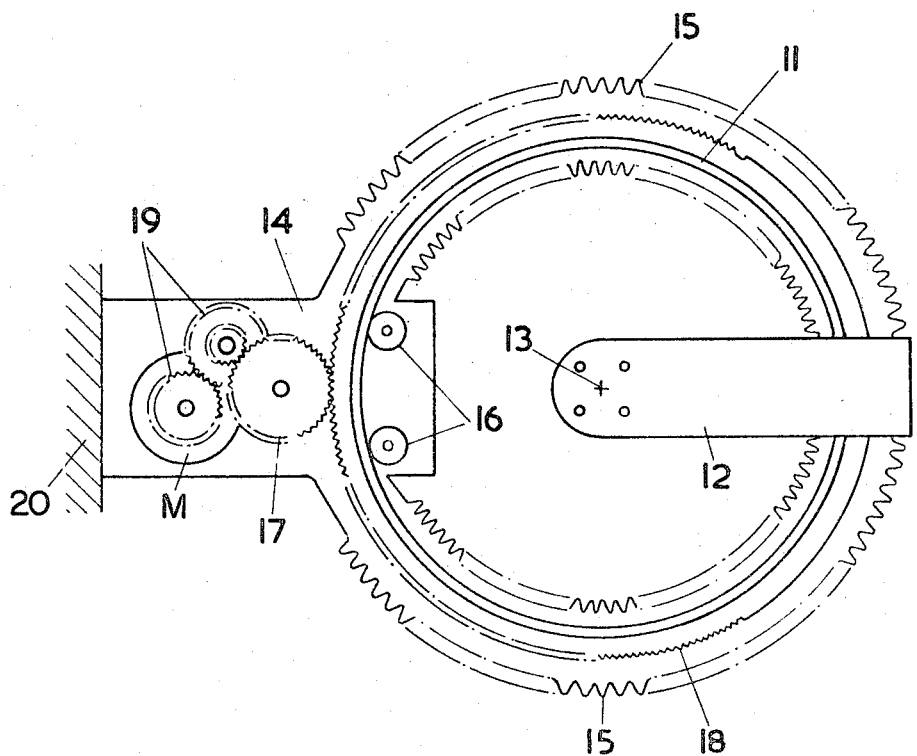

Nov. 14, 1967

R. F. WEST 3,352,174

PIVOTAL MOUNTINGS OR CONNECTIONS

Filed June 3, 1965

5 Sheets-Sheet 1

Inventor
R. F. WEST
By Cameron, Kerkam & Sutton
Attorneys

Nov. 14, 1967    R. F. WEST    3,352,174
PIVOTAL MOUNTINGS OR CONNECTIONS
Filed June 3, 1965    5 Sheets-Sheet 2
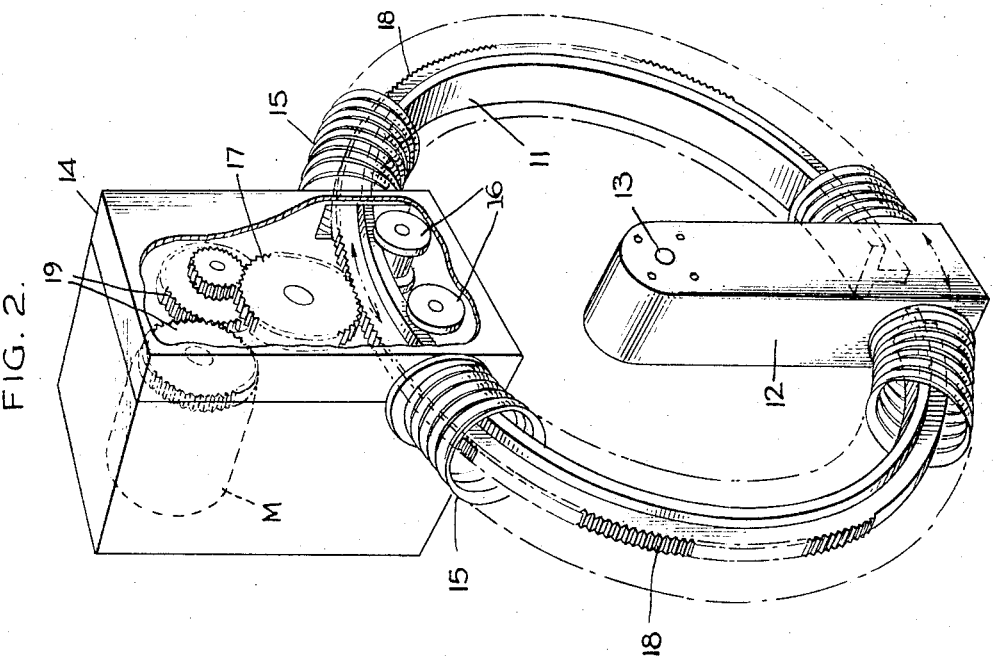
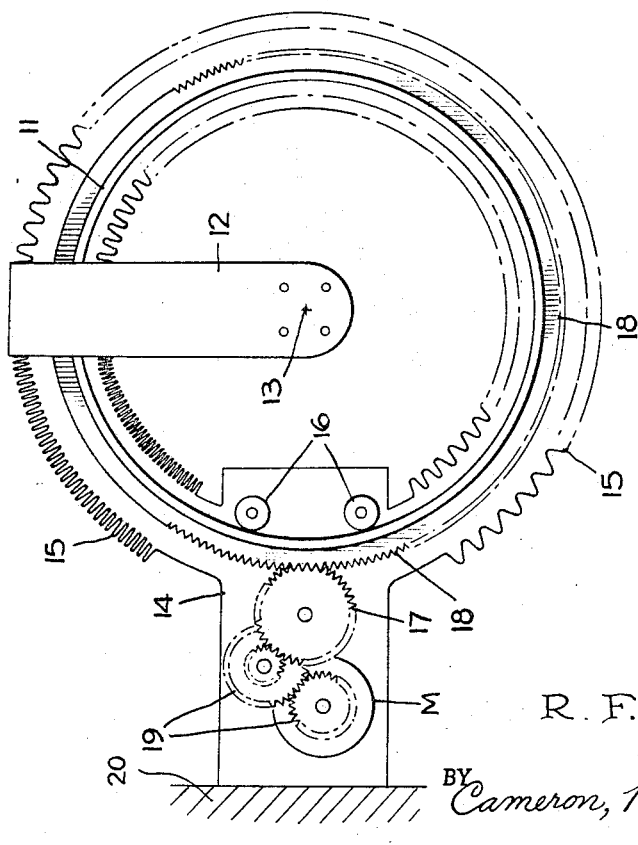
INVENTOR
R. F. WEST
BY Cameron, Kerkam & Sutton
ATTORNEYS Nov. 14, 1967  R. F. WEST  3,352,174
PIVOTAL MOUNTINGS OR CONNECTIONS
Filed June 3, 1965  5 Sheets-Sheet 5

*Inventor*
R. F. WEST
Cameron, Kerkam + Sutton
*Attorneys*

United States Patent Office 3,352,174
Patented Nov. 14, 1967

3,352,174
PIVOTAL MOUNTINGS OR CONNECTIONS
Ronald Frederick West, Aldershot, England, assignor to Minister of Aviation in Her Britannic Majesty's Government of the United Kingdom of Great Britain and Northern Ireland, London, England
Filed June 3, 1965, Ser. No. 461,122
Claims priority, application Great Britain, June 5, 1964, 23,457/64
16 Claims. (Cl. 74—608)

This invention relates to pivotal mountings or means for connecting two units together for relative angular movement, and has for an object to provide improved connecting means for this purpose which has its co-operating or working parts shielded or enclosed to enable the device to be used over prolonged periods of time under unfavourable environmental conditions, such as those prevailing in outer space where exposed pivots or bearings are liable to damage and consequent malfunction or even seizure.

According to the invention, pivotal connecting means for connecting two units together for relative angular movement in unfavourable environmental conditions comprise a circularly curved rigid rail for attachment to a first unit and a housing for attachment to a second unit, the housing being fully threaded over the circularly curved rigid rail so that the rail extends through the housing, guide means fixed in the housing bearing inwardly and outwardly firmly on to the circularly curved rigid rail at the outer and inner surfaces thereof and thereby constraining the rail and the housing to relative angular movement about the axis or centre of the circular curve, two lengths of extensile and contractile flexible metallic bellows which respectively extend fluid-tight, i.e., hermetically, over the circularly curved rigid rail from the two opposite parts of the rail which are circumferentially equidistant from the housing when the latter is at an intermediate position on the circularly curved rigid rail.

The extent of angular or hinged motion that is possible with connecting means according to the invention is dependent, among other things, upon the extent to which the extensile and contractile bellows are capable of extending and contracting and upon the length of the rigid rail and what proportion of that length is occupied by the bellows. In any particular case the rail should be long enough to accommodate thereover at either side of the housing a sufficient length or bellows to accommodate without undue stress so much relative motion of the rail and housing lengthwise of the rail as corresponds to the required extent of relative angular motion.

For limited relative angular or hinged motion, say not more than plus or minus forty five degrees from a reference datum (e.g. 90°), the rail may be in the form of a rigid closed ring-like structure so guided by the guide means in the housing that the relative rotation of the housing and the ring-like structure is about the centre of the latter. In such a case the ring-like structure may have a rigid inward extension extending radially to and beyond its centre for attachment to one of two units to be connected together for relative angular motion, the housing having provision for attachment thereto of the other unit or itself forming part of the latter.

In cases where greater relative angular or hinged motion is needed, say up to at least plus or minus ninety degrees from a reference datum, than can be accommodated by the degree of contraction and extension of which bellows sections disposed around and, together with the housing, enclosing a closed ring-like structure, are capable, the rigid rail may have a circularly curved intermediate portion for travel thereover of, and travel thereof through, the housing, and, extending from said intermediate circularly curved portion, two end portions of sufficient length and appropriate configuration to accommodate over them a sufficient total length of bellows for the required extent of contraction and extension. In one such case the circularly curved rigid rail is in the general form of a short axially helical coil like an axially opened or stretched split- or key-ring with the housing confined substantially to an intermediate part of the helical coil length and the ends of the coil joined by a member or structure extending through or outside the coil from end to end. For example, such a "key-ring" coil may have two radially inward, spoke-like extensions to its axis whose inner ends are joined by a member extending axially through the coil. In another such case, the rigid rail is of generally U-shaped configuration comprising two straight end portions corresponding to the sides of the U and, joining them, an intermediate arcuate portion corresponding to the base of the U.

In general, the housing encloses means for driving the circularly curved rigid rail through the housing, and the housing along the circularly curved rail and, preferably, part of the guide means which co-operate therein with said circularly curved rail include at least one friction or toothed wheel which co-operates with a complementarily formed part of the rail for this purpose. Thus, one of a series of guide rollers co-operating with the circularly curved rigid rail within the housing may be in the form of a toothed wheel which co-operates with a convex or concave toothed rack on the circularly curved rail. The housing may also contain or share a common casing with an electric drive motor, or may have provision for connection therewith and to a driven member therein of an enclosed flexible drive shaft of known type as used to drive speedometers in road vehicles.

Figure 4:
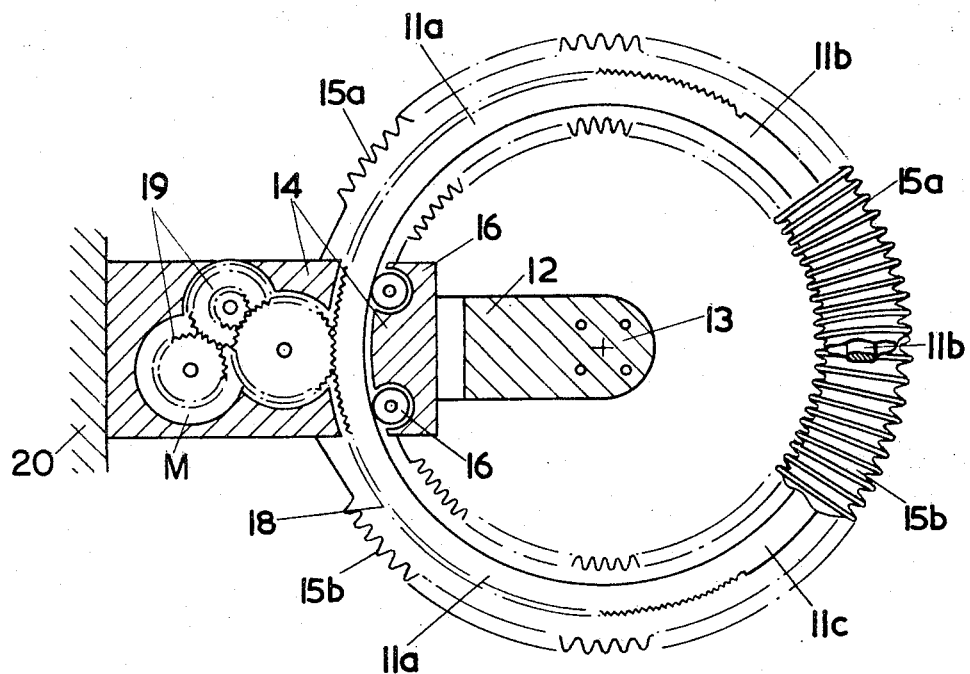
Figure 5:
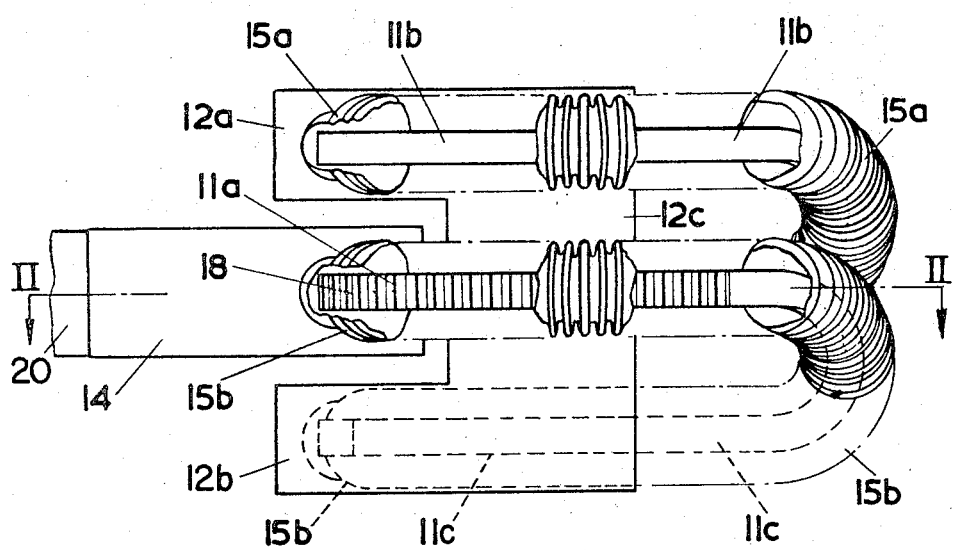
Figure 6:
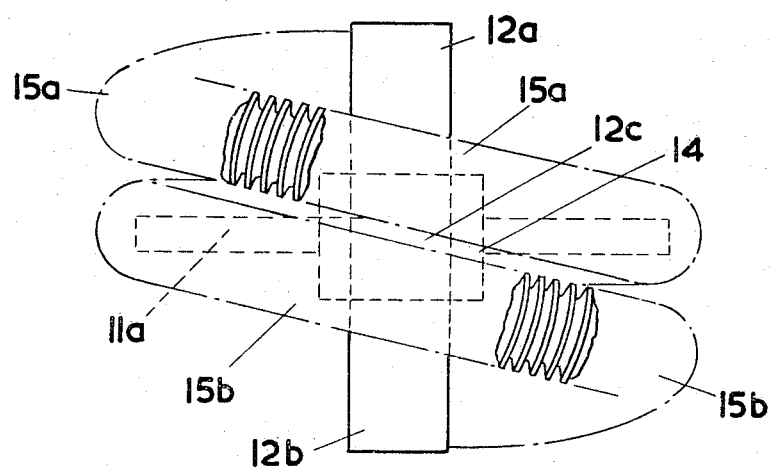
Figure 7:
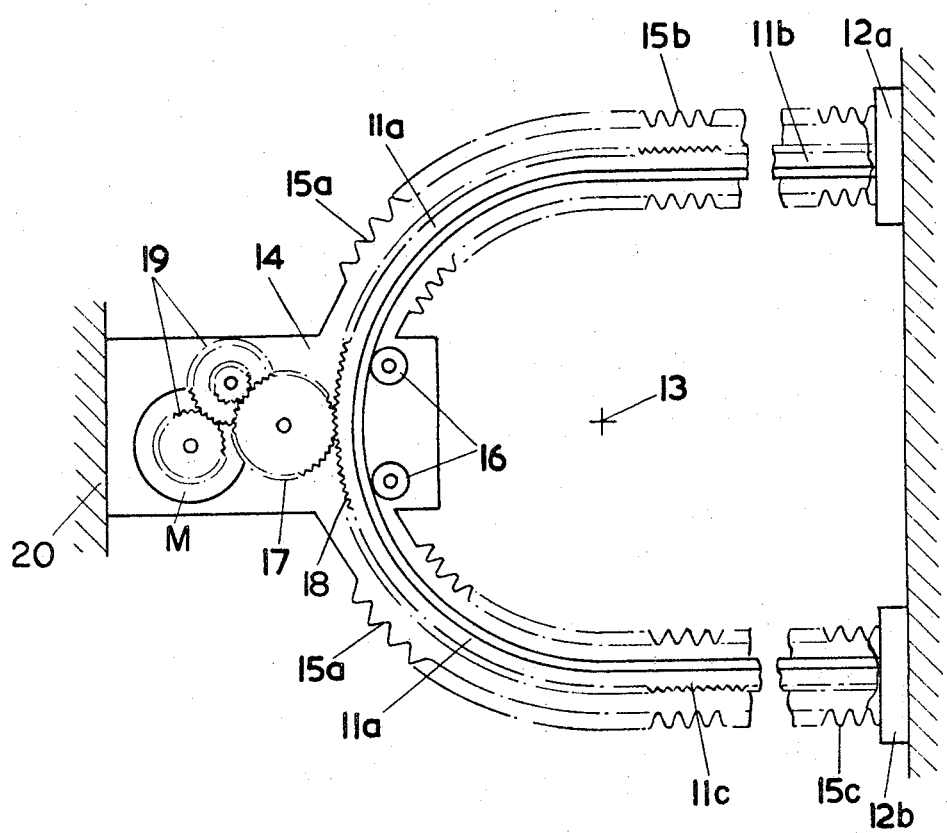

Three embodiments of the invention in which the circularly curved rigid rail is in the form of a rigid closed ring-like structure, an open split or key ring-like structure, and a substantially U-shaped structure, are illustrated by the accompanying diagrammatic drawings which are not to scale and of which:

FIGURE 1 is a part sectional view looking in the direction of the axis of the closed ring-like arrangement, FIGURE 2 is a perspective view of the arrangement shown in FIGURE 1 with parts of the housing and the bellows cut away, FIGURE 3 is a view similar to FIGURE 1, but showing the ring-like rail angularly displaced relative to the housing, FIGURE 4 is a view similar to FIGURE 1 of the split ring arrangement on the line II—II of FIGURE 5, FIGURE 5 is a plan view corresponding to FIGURE 4 with parts of the bellows cut away, FIGURE 6 is a line diagram for simplicity corresponding to a view from the right hand side of FIGURE 5, and FIGURE 7 is a view similar to FIGURE 1 of the U-shaped rigid rail arrangement.

As shown in FIGURES 1, 2 and 3, a rigid rail in the form of a closed ring-like member 11 has secured thereto locally of its circumference a rigid attachment member 12 extending radially inwardly to and beyond its centre or axis 13. By itself, the member 11 is in the form of a circular C and the outer end of the attachment member 12 is fitted between its end and secured thereto by welding. Before the member 12 is thus fitted, however, there is threaded over the ring-like curved rail 11 a housing 14 and, at opposite sides, respectively, of the housing 14, two lengths of lengthwise extensile and contractile, flexible, metallic bellows 15, 15 of which latter opposite ends are secured fluid-tight by welding to the corresponding sides of the housing 14 and the attachment member 12, respectively.

Within the housing 14 the ring-like curved rail 11 passes between two guide rollers 16 which bear outwardly on the inner concave face of the ring-like curved rail 11, and a toothed pinion 17, which bears inwardly upon and meshes with teeth of a convex rack formed on the curved rail 11 as indicated at 18. This pinion 17 is spring pressed (by means not shown in the drawing) into engagement with the rack teeth 18 on the curved rail 11 to hold the latter firmly against the rollers 16 and thus maintain the axis 13 of the ring curved rail 11 fixed translationally with respect to the housing 14. Within the housing 14 the pinion 17 is connected by gearing 19 to a drive motor M for drawing the ring-like curved rail 11 circumferentially through the housing 14 and between the pinion 17 and guide rollers 16 about its axis 13, in either sense as may be required and so far as is permitted by the extent to which the metallic bellows 15, 15 are capable of contraction and extension from the datum position shown.

In FIGURE 1 the housing 14 is shown as having a foundation or base 20 representing one unit to which a second unit attached to member 12 is to be attached and supported pivotally. It will be apparent, however, that in some cases it may be more convenient or desirable for the member 12 attached to the curved rail 11 to be attached to a foundation or base unit and the second unit to be attached to the housing 14 for pivotal support. In the case of outer space use, however, it will not, in general, be possible to regard either the ring or the housing as supporting the other in view of the condition of weightlessness.

Turning now to the "split-ring" form shown in FIGURES 4, 5 and 6 where corresponding parts were generally indicated by the same reference numerals, in this case the circularly curved rigid rail is in the form of an open, axially helical, two-turn coil resembling an open key ring. This has a substantially flat or planar C-shaped intermediate portion 11a of not greatly more than one half-turn length and which merges at its ends into two end portions 11b and 11c of the order of three-quarters of a turn length each. The intermediate portion 11a extends through the housing 14 in which a toothed drive wheel 17 engages rack teeth 18 thereon and guide rollers 16, 16 co-operate with its inner concave surface as in the case of FIGURE 1.

The outer ends of the end portions 11b and 11c of the curved rail have extending radially inwardly from them two rigid members 12a and 12b, respectively, of which the inner ends are axially joined by a rigid member 12c which extends axially through the coil. A first length of extensile and contractile bellows 15a extends fluid-tight over the rigid rail at 11a, 11b from the housing 14 to the radial member 12a to which the end portion 11b of the rigid rail is attached, and, a second length of said bellows extends fluid-tight over the rail at 11a, 11c from the housing 14 to the radial member 12b to which the end portion 11c of the rail is attached.

It will be apparent that for the same diameter this two turn arrangement will accommodate something like twice the length of bellows and so permit about twice the relative angular or hinging motion of the housing 14 relative to the radial member 12 as in the case of the single turn or closed ring arrangement of FIGURE 1.

In the arrangement shown in FIGURE 7 the U-shaped rigid rail has a flat or planar substantially semi-circular intermediate portion 11a, 11a formed with a toothed rack 18 meshing with a toothed driver wheel 17 in the housing 14 just as in the case of FIGURE 1 and in that of FIGURES 4, 5 and 6. Instead of continuing in circular form as in FIGURE 1 or in FIGURES 4, 5 and 6, however, the semi-circular central portion of the circularly curved rigid rail joins two end portions indicated at 11b and 11c in FIGURE 7 which extend substantially parallel with one another to two end members 12a and 12b for attachment to one of two units to be pivotally connected or hinged together. Two lengths of extensile and contractile bellows extend fluid-tight over the rigid rail at 11a, 11b and at 11a and 11c as indicated at 15a and 15b and at 15a and 15c, between the housing 14 and the end member 12a and the housing 14 and the end member 12b, respectively. In use the end members 12a and 12b may be attached to one of two units to be pivoted together about the axis or centre 13.

I claim:

1. Pivotal connecting means for connecting two units together for relative angular movement, comprising a housing for attachment to one of the two units, guide means in the housing, a circularly curved rigid rail for attachment to the other of the two units, the rail extending through the housing and having concave and convex surfaces which bear firmly outwardly and inwardly upon the guide means in the housing, the rail and the housing being movable relative to another and the guide means constraining that relative movement to an angular movement about the axis or centre of the circular curve of the rigid rail, and two lengths of extensile and contractile flexible metallic bellows which respectively extend fluid-tight over the circularly curved rigid rail between the opposite sides of the housing and parts of the rail which are circumferentially equidistant from the housing when the latter is at an intermediate position on the rail.

2. Pivotal connecting means as claimed in claim 1, wherein the rigid rail is in the form of a rigid closed ring-like structure and the relative angular motion is substantially about the centre of the latter.

3. Pivotal connecting means as claimed in claim 2, wherein the rigid ring-like structure has a rigid inward extension extending radially inwardly therefrom at least to its centre for attachment thereto of one of the two units to be connected together for relative angular movement.

4. Pivotal connecting means as claimed in claim 1, wherein the rigid rail has a circularly curved intermediate portion movable relative to the guide means in the housing and, extending from said intermediate portion, two end portions on which are accommodated the two lengths of extensile and contractile bellows.

5. Pivotal connecting means as claimed in claim 4, wherein the circularly curved rigid rail is in the general form of a short axially helical coil like an open key-ring with the housing confined substantially to the curved intermediate portion of the coil, wherein said intermediate portion is substantially flat, and wherein the ends of the coil are joined by a rigid member.

6. Pivotal connecting means as claimed in claim 5, wherein the coil has two radially inward, spoke-like, extensions whose inner ends are joined by a member extending through the coil.

7. Pivotal connecting means as claimed in claim 4, wherein the circularly curved rigid rail is generally of U-shaped configuration comprising two straight end portions corresponding to the sides of the U and, joining them, an intermediate circularly curved portion corresponding to the base of the U.

8. Pivotal connecting means as claimed in claim 1, wherein the housing encloses means for producing relative angular movement between the circularly curved rigid rail and the housing.

9. Pivotal connecting means as claimed in claim 8, wherein the movement producing means in the housing include at least one toothed wheel and the circularly curved rail is formed with a toothed rack meshing with said wheel.

10. Pivotal connecting means as claimed in claim 8, wherein the movement producing means include a drive motor associated fluid-tight with the housing.

11. Pivotal connecting means as claimed in claim 2, wherein the housing encloses means for driving the rigid rail through it and itself along the rail.

12. Pivotal connecting means as claimed in claim 11, wherein the guide means in the housing include at least one toothed wheel and the rigid rail is formed with a toothed rack meshing with said wheel.

13. Pivotal connecting means as claimed in claim 11, wherein the driving means include a drive motor associated fluid-tight with the housing.

14. Pivotal connecting means as claimed in claim 4, wherein the housing encloses means for driving the rigid rail through it and itself along the rail.

15. Pivotal connecting means as claimed in claim 14, wherein the guide means in the housing include at least one toothed wheel and the rigid rail is formed with a toothed rack meshing with said wheel.

16. Pivotal connecting means as claimed in claim 14, wherein the driving means include a drive motor associated fluid-tight with the housing.

References Cited

UNITED STATES PATENTS

| | | | |
|---|---|---|---|
| 1,907,914 | 5/1933 | Ward | 133—116 |
| 1,928,380 | 9/1933 | Jeager et al. | 259—176 |
| 3,137,966 | 6/1964 | Lohr | 74—5.7 |
| 3,160,018 | 12/1964 | Johnston | 74—5.7 |
| 3,188,639 | 6/1965 | Cook et al. | 244—1 |

FRED C. MATTERN, JR., *Primary Examiner.*

W. S. RATLIFF, *Assistant Examiner.*